United States Patent [19]

Griffith

[11] Patent Number: 4,925,332
[45] Date of Patent: May 15, 1990

[54] SINGLE-PLANE T-CONNECTOR FOR A PAIR OF TAP CABLES

[76] Inventor: Charles E. Griffith, 112121 Whisperwood La., Rockville, Md. 20852

[21] Appl. No.: 164,467
[22] Filed: Mar. 4, 1988
[51] Int. Cl.⁵ ............................... F16B 7/04
[52] U.S. Cl. .................. 403/373; 403/385; 439/804
[58] Field of Search ............. 403/385, 399, 391, 373, 403/344; 439/810, 811, 815, 804, 807; 24/284, 569, 459

[56] References Cited

U.S. PATENT DOCUMENTS

| | | | |
|---|---|---|---|
| 1,370,544 | 3/1921 | Leeper | 439/804 X |
| 1,997,627 | 4/1935 | Casey | 439/804 |
| 2,205,474 | 6/1940 | Goeller | 403/373 |
| 2,287,761 | 6/1942 | Matthysse | 439/804 |
| 2,885,653 | 5/1959 | Bethea et al. | |
| 2,887,669 | 5/1959 | Sylvester | 403/391 X |
| 2,900,617 | 8/1959 | Hixon | 439/804 |
| 2,937,225 | 5/1960 | Kaminski, Jr. et al. | 403/373 X |
| 2,942,898 | 6/1960 | Matthysse | 403/385 |
| 3,588,791 | 6/1971 | Polideri | |
| 3,739,322 | 6/1973 | Haegert | 439/804 X |
| 4,169,652 | 10/1979 | Höckele et al. | 439/804 X |
| 4,324,949 | 4/1982 | Grandjean | |
| 4,513,169 | 4/1985 | McGrane | |

Primary Examiner—Randolph A. Reese
Assistant Examiner—Peter M. Cuomo
Attorney, Agent, or Firm—Spencer & Frank

[57] ABSTRACT

A single-plane T-connector for joining a pair of tap cables to a service bus cable includes a front clamp member having a shoulder which is connected to a compression ferrule for joining one of the tap cables. The connector also includes a rear clamp member with a shoulder which is connected to another compression ferrule for the other tap cable. Both clamp members have inner faces with arcuate regions which receive the service bus cable. The inner faces of each clamp member also have regions, on either side of the respective arcuate portion, which slope in different directions. The front clamp member has captured bolts which screw into the rear clamp member to connect the clamp members around the bus cable. The configuration of the inner faces of the clamp members permits the ferrules to lie in a plane which passes through the bus cable, thus avoiding wasted space in a manhole or building vault. Furthermore the configuration of the inner faces permits the front and rear clamp members to be bolted together so that both ferrules are on the same side of the bus cable, or so that the ferrules are on opposite sides.

15 Claims, 3 Drawing Sheets

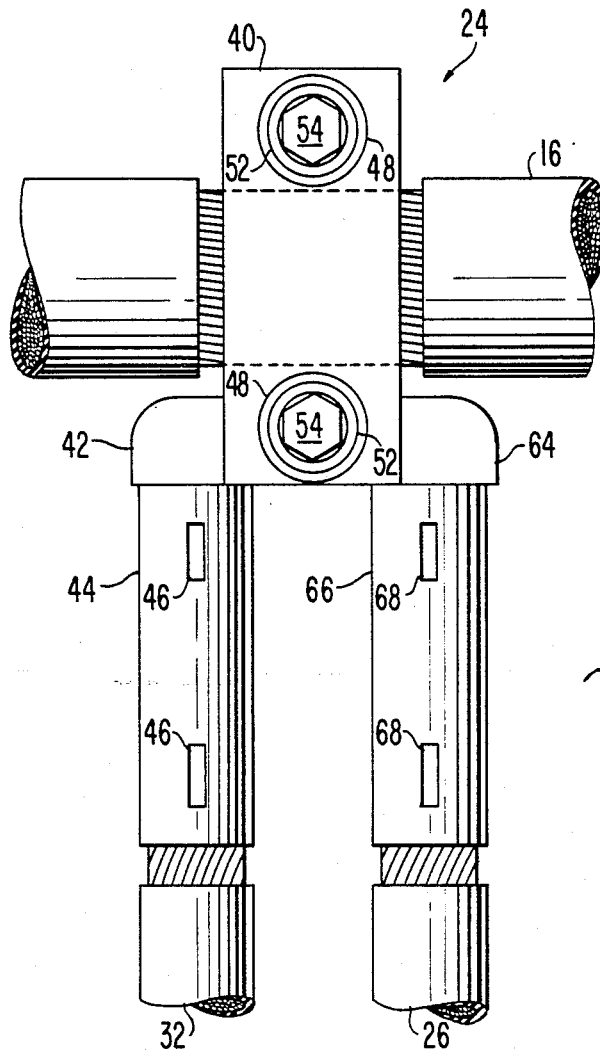
FIG. 2
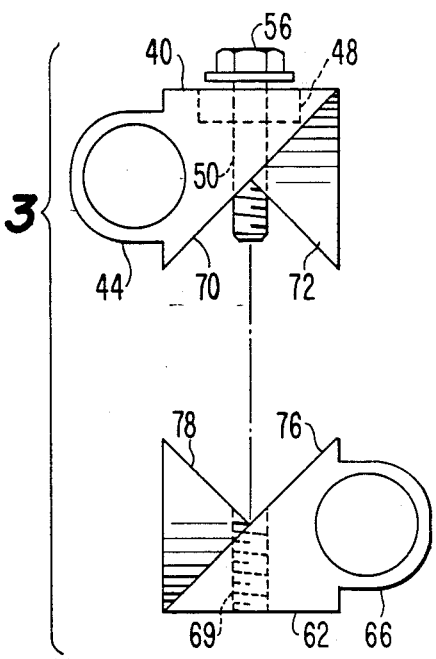
FIG. 3
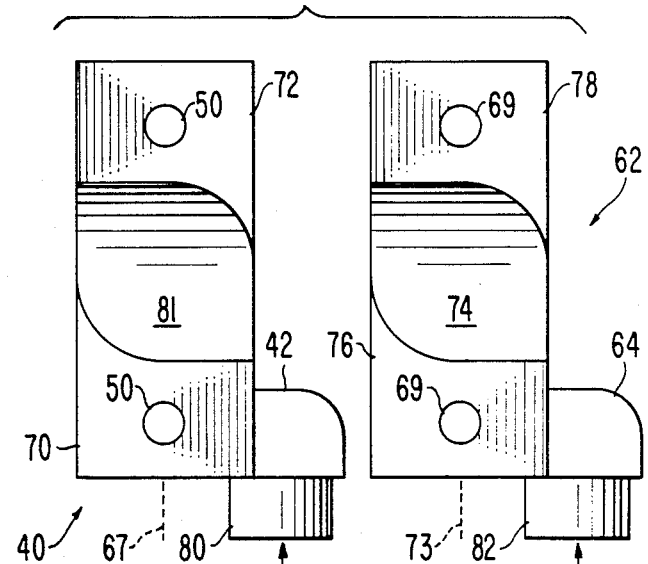
FIG. 4
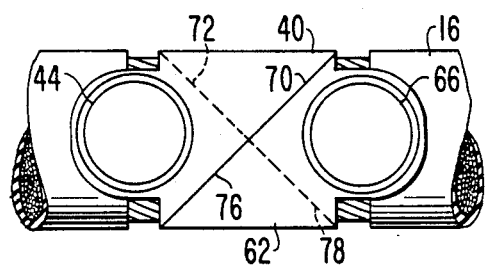
FIG. 6
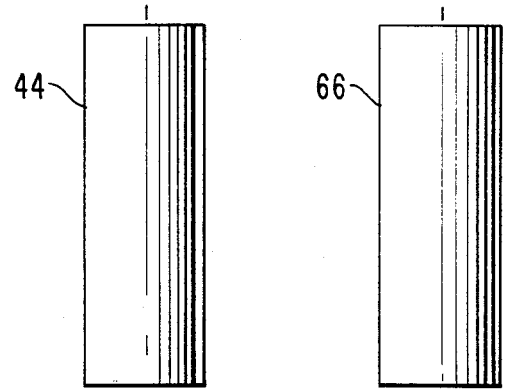

4,925,332

SINGLE-PLANE T-CONNECTOR FOR A PAIR OF TAP CABLES

BACKGROUND OF THE INVENTION

The present invention is directed to a T-connector for use in a low-voltage AC service network, and more particularly to a T-connector for use in a service bus manhole or building vault for connecting a bus cable to two tap cables, such as a supply cable and a service cable.

In an electrical power distribution network for use in an urban area, transformers are used to step down high-voltage AC to voltage levels suitable for use in buildings. The reduced-voltage power is then distributed via a low voltage AC service network. The term "low-voltage" in the electrical power industry means 600 volts or below.

The particular configuration of the low-voltage AC service network may vary depending upon a number of factors, such as the power requirements of the customers, local regulation, and the date when the network was initially installed. Typically a multi-cable bus in a manhole is connected to three-phase stepdown transformers by supply cables. The cables of the bus are in turn connected by service cables to metering cabinets in the building or buildings served by the network. Limiters placed into the supply and service cables serve as fuses to provide protection in the event of accidental short-circuits or unexpectedly high demand. Connectors are used to electrically join the bus cable to the supply and service cables. A hundred or more such connectors might be installed when a manhole is built. Additional connectors might be needed later if power demands on the service network increase.

A typical supply bus in a manhole might include three 1500 KCM (thousand circular mill—indicating a diameter of around an inch and a half) cables, each connected to one of three electrical phases. A number of transformers supply power for each cable. Each of these supply cables might carry up to 600 amperes, with a phase-to-phase voltage of 208 or 460 volts. The three-phase power is available for air-conditioning, elevators, and other large loads. The typical supply bus also includes a ground cable, with the voltage between the ground cable and one of the other bus cables being 120 or 265 volts. This voltage is used for lighting, office equipment, etc. The supply and service cables might be 500 KCM (about one inch) in diameter.

While the service bus has been described above as being located in a manhole, because of increasing congestion in urban areas there is a growing tendency to install the supply bus for a low-voltage AC service network in the building which is to be served. A dedicated room called a "building vault" is used for this purpose. Building vaults are frequently positioned on top of buildings so that they will be near motors for air-conditioners and elevators. In a typical manhole both the supply cables and service cables extend downward from the bus cables. In a typical building vault, in contrast, the supply cables extend up to the bus cables and the service cables extend down to the bus cables.

A conventional double-tap connector may be bolted to a supply bus cable, and joined to the supply and service cables by compression indents, or crimps. Such conventional connectors protrude into the interior of the manhole or building vault, and thereby limit the space available for technicians to rack cables beneath the bus cables. Furthermore, the inventory requirements for conventional connectors are relatively high.

SUMMARY OF THE INVENTION

One object of the invention is to provide a compact connector which joins a bus cable to a pair of tap cables, such as a supply cable and service cable, without protruding substantially into the interior of a manhole or service vault. A related object is to provide a compact connector which is bolted to the bus cable and which is provided with compression ferrules for receiving a pair of tap cables, the ferrules having axes which lie in a plane running through the axis of the bus cable.

Another object of the invention is to provide a connector which joins a bus cable to a pair of tap cables, such as a supply cable and service cable, and which can be installed either in a manhole, with both the supply and service cables being located on the same side of the bus cable, or in a building vault, with the supply and service cables being located on either side of the bus cable.

These and other objects which will become apparent in the ensuing detailed description can be attained by providing a T-connector which includes a front clamp member having an inner face with an arcuate region between first and second contact regions, means such as a compression ferrule joined to the front clamp member for receiving the end segment of a tap cable so that the axis thereof is parallel to the axis of the front clamp member, a rear clamp member having an inner face with an arcuate region between first and second contact regions, means such as another compression ferrule joined to the rear clamp member for receiving the end segment of another tap cable so that the axis thereof is parallel to the axis of the rear clamp member, and means such as bolts captured in the front clamp member for connecting the front and rear clamp members around a bus cable so that the arcuate regions engage the bus cable and so that the contact regions of the front clamp member engage the contact regions of the rear clamp member, with the axes of the end segments of the tap cables being substantially parallel to one another and running through the bus cable and preferably through the axis thereof. The first and second contact regions of each clamp member preferably slope in opposite directions so that the tap cables can be disposed on the same side of the bus cable or on opposite sides.

BRIEF DESCRIPTION OF THE DRAWINGS

FIG. 2 is a front plan view of a connector bolted onto a bus cable and joined to supply and service cables by compression taps;

FIG. 3 is an exploded bottom plan view of the connector;

FIG. 4 is an exploded plan view illustrating the inner faces of the front and rear clamp members, and assembly of the ferrules.

FIG. 6 is a bottom plan view of the connector, bolted to the bus cable;

DESCRIPTION OF THE PREFERRED EMBODIMENT

Figure 1:
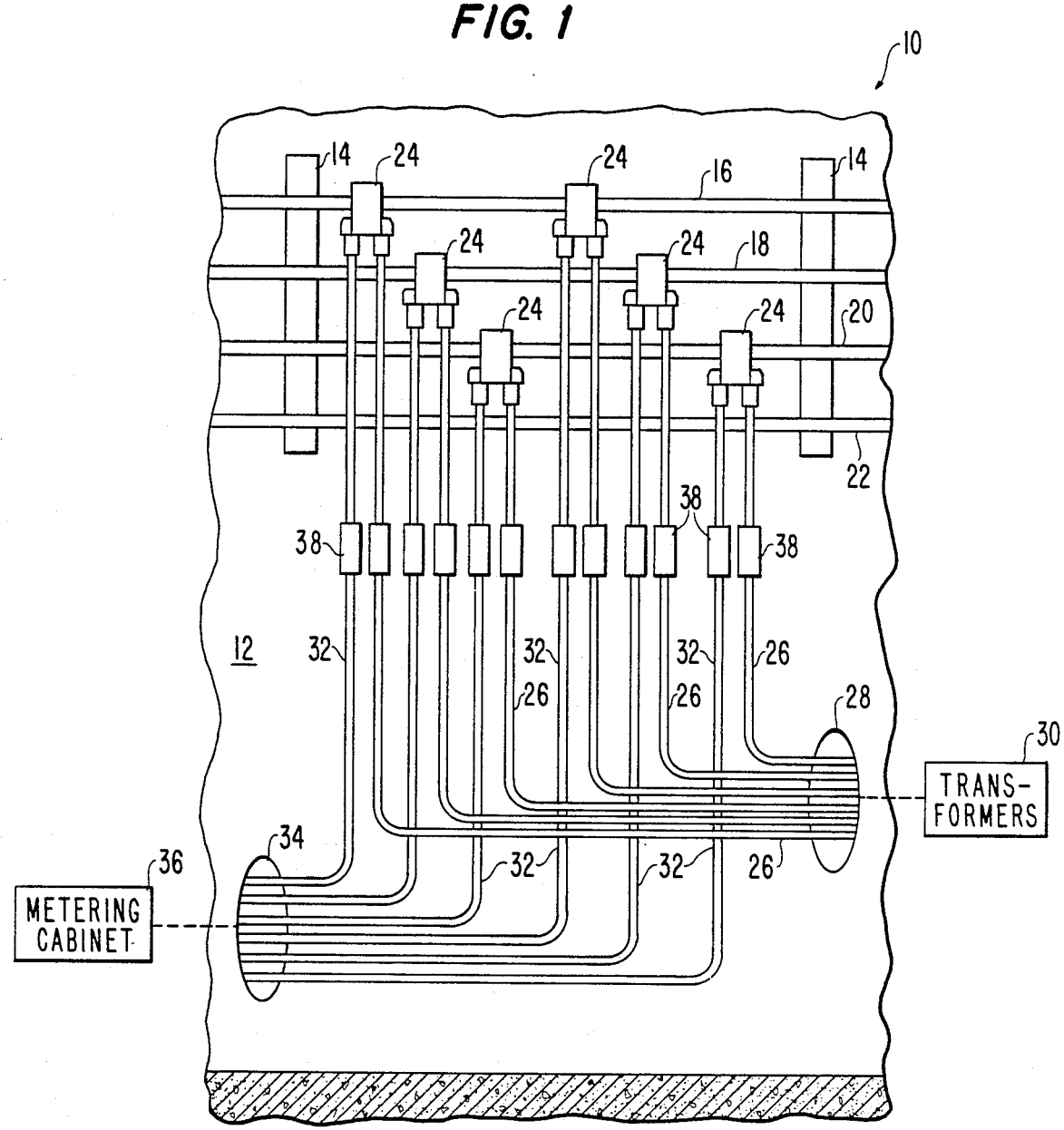
FIG. 1 is a plan view of a portion of a manhole in which T-connectors in accordance with the present invention are employed to join service bus cables to supply cables and service cables.

FIG. 1 illustrates a portion of a service bus manhole 10 having a wall 12 to which insulating supports 14 are attached. Supply bus cables 16, 18 and 20 are attached to supports 14 by clamps (not illustrated). Cables 16, 18 and 20 are insulated 1500 KCM cables which are positioned five and a quarter inches apart. Bus cable 22, which is also mounted on supports 14, is a neutral, ground cable which may have a smaller diameter. T-connectors 24 in accordance to the present invention are bolted to cables 16, 18 and 20 at places where the insulation has been removed (not illustrated in FIG. 1). Insulated 500 KCM supply cables 26 extend from connectors 24 through a supply duct 28 in wall 12 to a plurality of three-phase transformers 30 located in transformer manholes (not illustrated). Insulated 500 KCM service cables 32 extend through a service duct 34 in wall 12 to a metering cabinet 36 in a building (not illustrated) served by manhole 10. Cables 26 and 32 are "tap cables" which are connected to bus cables 14–20. Limiters 38 are are fuses spliced into the supply cables 26 and service cables 32.

FIG. 2 illustrates one of the connectors 24 shown in FIG. 1 in more detail. The connector includes a front clamp member 40 having a shoulder 42 to which is attached a tubular compression ferrule 44. The term "compression" here means that, after insulation has been stripped from the end of service cable 32 and the stripped end has been inserted into ferrule 44, a technician with a crimping tool (not illustrated) can form depressed regions 46 whereby the metal of ferrule 44 is compressed into cable 32 to electrically and mechanically join cable 32 to ferrule 44. Front clamp member 40 also has circular depressions 48 which communicate with threaded bores 50 (see FIG. 4). Depressions 48 accommodate washers 52 and the heads 54 of captured bolts 56 (see FIG. 8).

Figure 8:
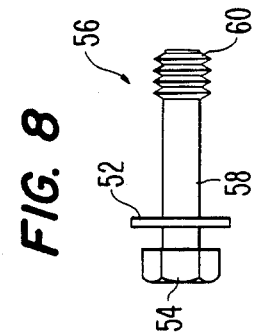
FIG. 8 is a side plan view of a bolt and washer configured to be captured in the front clamp member of the connector to minimize loose components that might otherwise be dropped.
Figure 5:
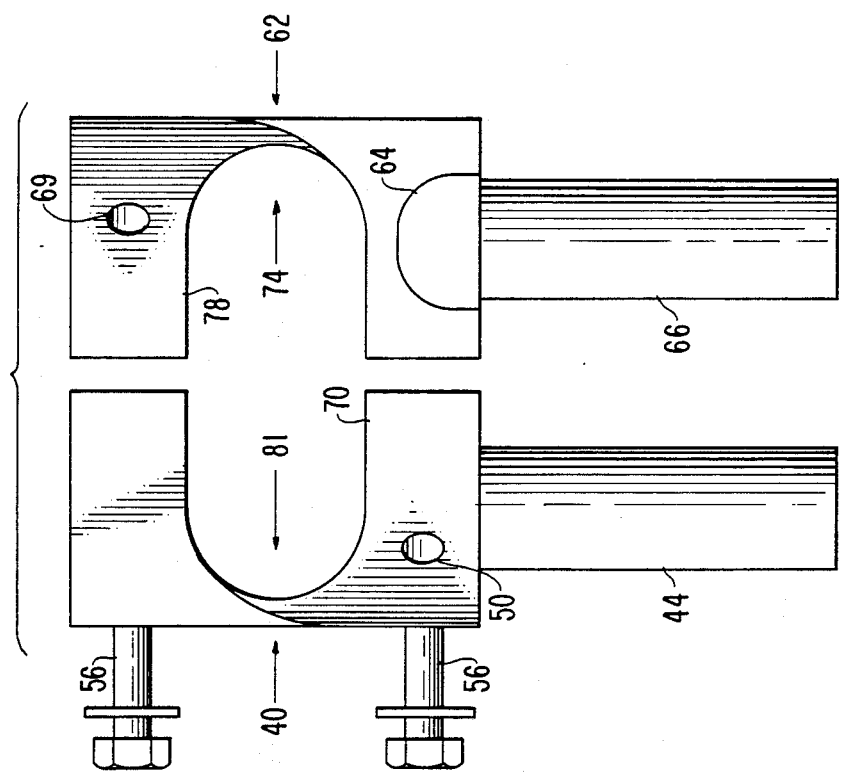
FIG. 5 is an exploded side view of the connector.

Referring next FIG. 8, bolt 56 has a shank portion 58 of reduced diameter and a threaded end portion 60. Bolts 56 had been described as "captured" because, before connector 24 is installed, end portions 60 are screwed through bores 50, leaving shank portion 58 positioned in bores 50. Bolts 56 are thus slightly retained in front clamp member 40.

With reference next to FIGS. 2 and 4 together, connector 24 also includes a rear clamp member 62 having a shoulder 64 to which is joined a compression ferrule 66. To connect supply cable 26 to ferrule 66, the end of cable 26 is stripped and inserted into ferrule 66 which is thereafter crimped as previously described to provide depressed regions 68. Rear clamp member 62 has threaded bores 69 to receive the threaded end portions 60 (see FIG. 8) of captured bolts 56.

As is seen in FIG. 4, front clamp member 40 has an axis 67 running through the top and bottom ends. Clamp member 40 also has an inner face with an arcuate region 81 disposed between first sloping contact region 70 and second sloping contact region 72. Similarly, rear portion 62 has an axis 73, and an inner face with an arcuate region 74 between a first sloping contact region 76 and a second sloping contact region 78. The first contact regions (70 and 76) slope in different directions from the second contact regions (72 and 78). When the elements are positioned as illustrated in FIG. 4, first contact regions 70 and 76 slope so that they are highest toward the right and second contact region 72 and 78 slope so that they are highest toward the left.

Referring next to FIGS. 2, 3, 4 and 5 (which for purpose of better illustrating the sloping region 70 is shown with the bolts 56 screwed slightly out, so that end portion 60 of the lower bolt 56 does not protrude as it would in practice), when connector 24 is to be installed so that tap cables 32 and 26 are located on the same side of bus cable 16, rear clamp member 62 is first positioned behind a stripped portion of bus cable 16, with the stripped portion fitting within arcuate region 74. Front clamp member 42, with its captured bolts 56 (see FIG. 8), is then pressed toward bus cable 16 so that cable 16 fits within arcuate region 81. In this position captured bolts 56 are poised to be screwed into threaded bores 69 to tightly clamp connector 24 to bus cable 16. First contact regions 70 and 76 come into contact along a first line and second contact regions 72 and 78 come into contact along a second line which crosses the first line. These crossing lines of contact are perhaps best illustrated in FIG. 6.

Front clamp member 40 has a mounting stub 80 (see FIG. 4) and, similarly, rear clamp member 62 has a mounting stub 82. During fabrication ferrules 44 and 66 are inserted onto mounting stubs 80 and 82, respectively, and attached by braising. Ferrule 44 is parallel to axis 67 and ferrule 66 is parallel to axis 73. Clamp members 40 and 62 are preferably made from copper by casting. Due to the symmetry of clamp members 40 and 62, it will be apparent that only one mold is needed. After casting, the threaded bores 50 and 69 are machined and ferrules 44 and 66 are attached. For clamp members that are selected for use as front clamp members 40, circular depressions 48 are also machined and captured bolts 56 are installed. While bolts 56 need not be captured in front clamp member 24, this feature is convenient to a technician in a manhole since it effectively reduces the number of components he must manipulate. A captured bolt doesn't get lost, or require the proverbial "third-hand" to install. Other methods than that described could be used for capturing bolts 56. Instead of providing a shank portion 58 and a threaded end portion 60 which is screwed through bores 50, for example, bores 50 might be made large enough to slidably accept the bolts, which might then be retained by temporarily wrapping O-rings (not illustrated) around them. Removal of such O-rings before installation of connector 24 could be avoided by machining shallow wells (not illustrated) at the entrances to bores 69.

In FIG. 2, it should be noted that the axis of ferrule 44 is parallel to the axis of ferrule 66, and both of these axes are perpendicular to the axis of cable 16. These axes define a substantially vertical plane, and it will be apparent that as a result the connector 24 does not protrude into the interior of manhole 10 (see FIG. 1). Instead, cables 26 and 32 lie side by side beneath cable 16. Furthermore the spacing between ferrules 44 and 66 permits limiters 38 (see FIG. 1) to be positioned side by side in a substantially straight row.

Returning to FIG. 3, it will be apparent that the general configuration at the bottoms of clamp members 40 and 62 is basically triangular, affording a relatively large region for connection to ferrules 44 and 66. These relatively large connection regions are significant in view of the high currents carried by connector 24. The large connection regions both reduce $I^2R$ heating and help dissipate heat that is generated.

Figure 7:
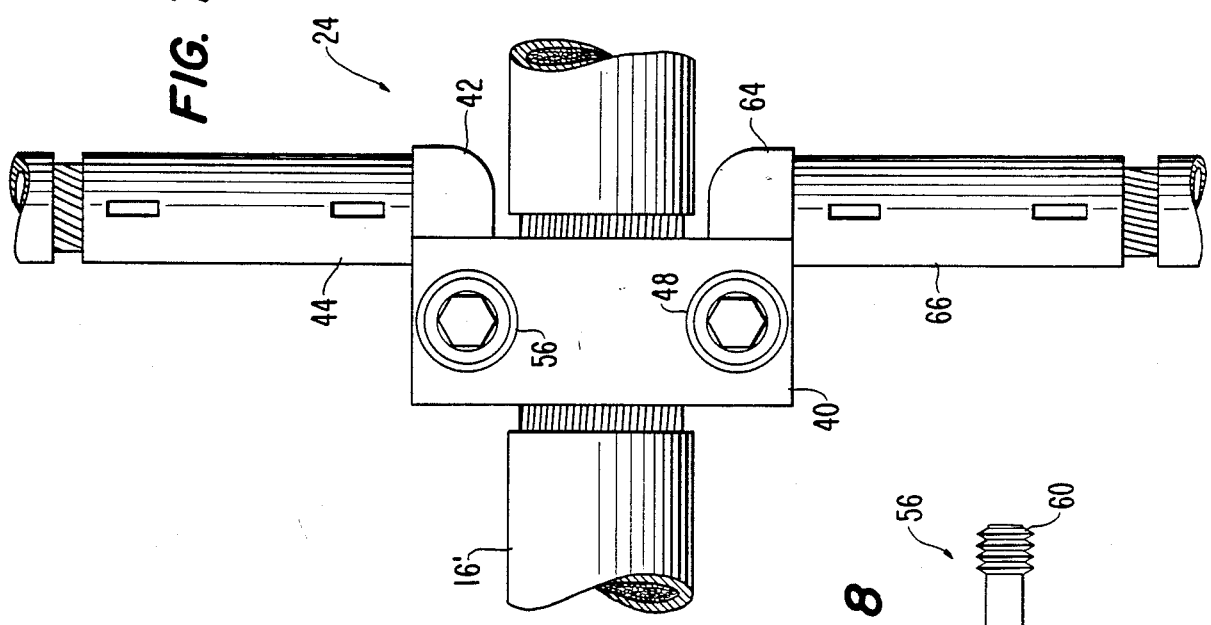
FIG. 7 is a front plan view of the connector bolted to a bus cable and joined by compression taps to supply and service cables, with the rear clamp member being reversed for use in a building vault.

FIG. 7 illustrates connector 24 attached to a service bus cable 16 in a building vault. In FIG. 7 the front clamp member 40 is reversed, so that ferrule 44 points upward. In this configuration, the first contact region 70 (see FIG. 4) of front clamp member 40 is clamped against second contact region 78 of rear clamp member 62, and second contact region 72 is clamped against first contact region 76.

It will be apparent from the foregoing discussion that the connector 24 of the present invention efficiently uses the space within a manhole or building vault because of its planar configuration, with the ferrules lying substantially in a plane which passes through the service bus cable, and furthermore that the connector reduces inventory requirements because it can be assembled with the ferrules on the same side or on the opposite sides of the bus cable.

What is claimed is:

1. A T-connector for connecting first and second tap cables to a service bus cable, the service bus cable having an axis and the tap cables having end segments with axes, comprising:
    a front clamp member having a first end and a second end and having an axis running through the first and second ends, the front clamp member additionally having an inner face with a first contact region adjacent the first end, a second contact region adjacent the second end, and an arcuate region between the first and second contact regions;
    first means for connecting the end segment of the first tap cable to the front clamp member so that the axis of the end segment of the first tap cable is parallel to the axis of the front clamp member;
    a rear clamp member having a first end and a second end and having an axis running through the first and second ends, the rear clamp member additionally having an inner face with a first contact region adjacent the first end of the rear clamp member, a second contact region adjacent the second end of the rear clamp member, and an arcuate region between the first and second contact regions of the rear clamp member;
    second means for connecting the end segment of the second tap cable to the rear clamp member so that the axis of the end segment of the second tap cable is parallel to the axis of the rear clamp member; and
    third means for connecting the front and rear clamp members around the service bus cable so that the arcuate regions of the clamp members engage the service bus cable and the contact regions of one clamp member engage the contact regions of the other clamp member, with the axes of the end segments of the tap cables being substantially parallel to one another and running through the service bus cable.

2. The T-connector of claim 1, wherein the axes of the end segments of the tap cables run substantially through the axis of the service bus cable.

3. The T-connector of claim 1, wherein the first means comprises a first tubular compression ferrule, and means for connecting the first compression ferrule to the front clamp member, and wherein the second means comprises a second tubular compression ferrule, and means for connecting the second compression ferrule to the rear clamp member.

4. The T-connector of claim 3, wherein the means for connecting the first compression ferrule comprises a mounting stub attached to the front clamp member, and wherein the means for connecting the second compression ferrule comprises a mounting stub attached to the rear clamp member.

5. The T-connector of claim 1, wherein the front clamp member has a bore extending through the first contact region and a bore extending through the second contact region, wherein the rear clamp member has a bore extending through the first contact region and a bore extending through the second contact region, and wherein the third means comprises a pair of bolts extending through the bores.

6. The T-connector of claim 5, wherein the bolts are slidably captured in the bores in the front clamp member, and wherein the bores in the second clamp member are threaded.

7. The T-connector of claim 1, wherein the first and second contact regions of the front clamp member lie in respective planes which extend through the axis of the service bus cable and which slope in opposite directions, and wherein the first and second contact regions of the rear clamp member lie in respective planes which extend through the axis of the service bus cable and which slope in opposite directions.

8. The T-connector of claim 7, wherein the front and rear clamp members are made of cast metal elements having identical shapes.

9. The T-connector of claim 7, wherein the first and second means are disposed on the same side of the service bus cable.

10. The T-connector of claim 7, wherein the first and second means are disposed on opposite sides of the service bus cable.

11. The T-connector of claim 1, wherein the axes of the end segments of the tap cables and the axis of the service bus cable lie substantially in a common plane.

12. The T-connector of claim 1, wherein the service bus cable is generally horizontal, and wherein the clamp members have substantially identical shapes and are configured to be selectively connected in first and second relative positions by the third means, both the first and second means being disposed below the service bus cable in the first relative position and only one of the first and second means being disposed below the service bus cable in the second relative position, the other of the first and second means in the second relative position being disposed above the service bus cable.

13. A T-connector for connecting first and second tap cables to a service bus cable, the service bus cable having an axis and the tap cables having end segments with axes, comprising:
    a front clamp member having a first end and a second end and having an axis running through the first and second ends, the front clamp member additionally having a first mounting stub extending from the first end, the front clamp member further having an inner face with a first contact region adjacent the first end, a second contact region adjacent the second end, and an arcuate region between the first and second contact regions, the first and second contact regions sloping in opposite directions;
    a first tubular ferrule connected to the first mounting stub to hold the end segment of the first tap cable so that the axis thereof is substantially parallel to the axis of the front clamp member;

a rear clamp member having a first end and a second end and having an axis running through the first and second ends of the rear clamp member, the rear clamp member additionally having a second mounting stub extending from the first end of the rear clamp member, the rear clamp member further having an inner face with a first contact region adjacent the first end of the rear clamp member, a second contact region adjacent the second end of the rear clamp member, and an arcuate region between the first and second contact reigns of the rear clamp member, the first and second contact regions of the rear clamp member sloping in opposite directions;

a second tubular ferrule connected to the second mounting stub to hold the end segment of the second tap cable so that the axis thereof is substantially parallel to the axis of the rear clamp member; and screw means for connecting the front and rear clamp members around the service bus cable so that the arcuate regions of the clamp members engage the service bus cable and so that the contact regions of one clamp member engage the contact regions of the other clamp member, with the axes of the end segments of the tap cables being substantially parallel to one another and running through the service bus cable, wherein the screw means can selectively connect the clamp members so that the first contact regions touch one another and the second contact regions touch one another, or so that the first contact regions touch the second contact regions.

14. The T-connector of claim 13, wherein the axes of the end segments of the tap cables and the axis of the service bus cable lie substantially in a common plane.

15. The T-connector of claim 13, wherein the service bus cable is generally horizontal, and wherein the clamp members have substantially identical shapes and are configured to be selectively connected in first and second relative positions, both the first and second ferrules being disposed below the service bus cable in the first relative position and only one of the first and second ferrules being disposed below the service bus cable in the second relative position, the other of the first and second ferrules in the second relative position being disposed above the service bus cable.

* * * * *